United States Patent Office 2,864,868
Patented Dec. 16, 1958

2,864,868

CYCLOPENTENYL PHENOLS AND METHOD FOR PREPARING THEM

Alfred R. Bader, Milwaukee, Wis., assignor to Pittsburgh Plate Glass Company, Allegheny County, Pa., a corporation of Pennsylvania No Drawing. Application July 22, 1952
Serial No. 300,359

9 Claims. (Cl. 260—621)

The present invention relates to the reaction of cyclopentadiene, substituted cyclopentadienes, or homopolymers of such cyclopentadienes with phenols, whereby substituted phenolic compounds or polymeric products or both are obtained, and pertains particularly to the preparation of cyclopentenylphenols, which are very useful for many purposes.

In accordance with the provisions of the present invention, phenols containing at least one available hydrogen atom in the nucleus are contacted with compounds containing the group

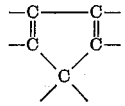

in the presence of a Friedel-Crafts catalyst whereupon chemical reaction occurs to form compounds of the general formula;

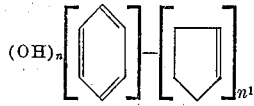

In the formula, $n$ and $n^1$ are whole numbers, usually from 1 to 3 and may be equal or unequal. In addition to compounds of the above type, some polyphenols or polymeric products, or both, are generally formed, the quantities of each product depending primarily on the particular reaction conditions which are employed.

The present invention is particularly applicable to compounds containing a single —OH group, e. g. phenol. However, the invention also includes the treatment of other hydroxylated benzenes or phenols including two or even three hydroxyls. They may also contain one or more alkoxy, hydrocarbon, or other substituent groups as side-chains. There must be at least one free or available hydrogen atom in the benzene ring in order that reaction with the cyclopentadiene may take place. Examples of such phenols containing a plurality of hydroxyls directly attached to a benzene ring are polyhydroxy phenols such as catechol, resorcinol, pyrogallol and phloroglucinol;

Alkylated phenols such as ortho cresol, meta cresol, para cresol, butyl resorcinol, and tertiary butyl catechol;

Substituted phenols such as ortho, meta or para nitrophenols and the corresponding amines derived by reduction of the nitrophenols, ortho, meta and parahalophenols, polyhalophenols, halogen substituted nitrophenols, guaiacol, 2,3-dimethoxyphenol, 3,5-dimethoxyphenol and the like.

Any of the phenolic compounds or derivatives thereof, as well as other phenolic compounds, reacts with cyclopentadiene or its homologues and substitution products to give substituted phenols and polymeric products.

While they do not contain conjugated double bonds, dicyclopentadiene, tricyclopentadiene and other homopolymers of cyclopentadiene may under appropriate conditions also be employed in the reaction, since they can be decomposed pyrolytically at 140° C. or above, to form cyclopentadiene which reacts in situ with phenolic compounds such as are described above.

Cyclopentadiene, or its equivalent of a lower homopolymer of cyclopentadiene, may be reacted with a phenolic compound over a wide range of molar proportions in accordance with the provisions of the present invention. For example, the proportion of the phenol and cyclopentadiene may be equi-molar or approximately equi-molar. However, most usually an excess of phenol is employed, since highest yields of the mono cyclopentenyl phenolic compounds are obtained when excess phenol is utilized. If yields are not of the essence, almost any proportions may be employed in the reaction. For example, the cyclopentadiene component may be employed in a molar percentage of 10 to 100 or even 200 or 300 or more percent with respect to the phenolic component in the mixture.

The reaction of the present invention may be carried out in the absence of diluent or solvents. However in many instances it is preferred to include such material in the reaction mixture. The diluent or solvent naturally should be non-reactive in the mixture. Examples of such diluents include hexane, heptane, toluene, xylene and other aromatic and non-aromatic hydrocarbons and similar non-reactive materials.

The temperature at which the reaction is carried out may be varied widely. For example, the reaction proceeds satisfactorily at temperatures as low as —20° C. or even lower and as high as 200° C. or higher with the preferred range being from about 0° C. to 150° C.

The reaction takes place readily at atmospheric pressure and is advantageously carried out in this manner. However, any added pressure may also be utilized if desired, as may subatmospheric pressures, provided they are not so low as unduly to volatilize the reactants.

The reaction of cyclopentadienes with phenolic compounds in accordance with the present invention is carried out in the presence of a Friedel-Crafts type catalyst. Examples of such catalysts include aluminum chloride, ferric chloride, antimony pentachloride, boron trifluoride, zinc chloride, titanium chloride, hydrofluoric acid, sulfuric acid, phosphoric acid, phosphorus pentoxide, stannic chloride, bismuth chloride and tellurium di and tetra chlorides. The Friedel-Crafts catalysts are discussed in detail in volume 3 of Organic Reactions (1946), pages 2 to 4.

The reaction can also be carried out in the presence of mixtures of two or more of the catalysts disclosed hereinabove. In fact, by selection of the proper catalyst mixture it is often possible to control the number of cyclopentenyl or phenolic groups which are combined. Most Friedel-Crafts catalysts can be placed in one of two series; that of acids, including hydrofluoric acid, sulfuric acid, phosphoric acid, in order of activity, and that of the Lewis acid salts, including aluminum chloride, boron trifluoride, antimony pentachloride, ferric chloride, tellurium dichloride, stannic chloride, titanium chloride, tellurium tetrachloride, bismuth chloride and zinc chloride, also in order of activity. The more active catalysts of these two series are in general too strong to give good yields of monocycloalkenylphenols but yield instead higher molecular weight phenols and other materials. However, the more active catalysts can be "diluted" with one of the less active catalysts or with a diluent to produce a catalyst mixture that will give satisfactory yields of the desired product. Mixtures of sulfuric acid and phosphoric acid, or boron trifluoride and phosphoric acid are examples of catalyst mixtures which give excellent yields of monocycloalkenylphenols. The strong Lewis acid salts are best "diluted" by forming their complexes with compounds such as ethers, alcohols and amines, that is, compounds containing atoms with unshared electron pairs which can form coordinate bonds with the Lewis acid salts. For example, the aluminum chloride-ethanol complex and the boron trifluoride-ether complex are both less active than either aluminum chloride or boron trifluoride alone.

85 percent phosphoric acid, and Friedel-Crafts catalysts of similar strength form a particularly preferred class of catalysts for use in the process of this invention since they are economically obtained and result in the formation of excellent yields of monocycloalkenylphenols.

As will be apparent from the following discussion, the amount of catalyst employed and also the reaction temperature have a substantial effect on the yields of each of the reaction products.

For example, by proper regulation of the conditions of reaction, it is possible to obtain ortho or paracyclopentenylphenol, di or tricyclopentenylphenols, polyphenols or polymeric products substantially at will.

These facts are illustrated in the preparation of orthocyclopentenylphenol which is readily obtained by heating a mixture of phenol and cyclopentadiene to a temperature of about 100° C. to 200° C. in the presence of only a small amount of catalyst, that is, below about five percent by weight based on the weight of the phenol. On the other hand, if the reaction is conducted at a low temperature, for example about 0° C. to 50° C. and in the presence of a considerable proportion of catalyst, for example, about 5 to 100 percent or more based on the weight of the phenol, paracyclopentenylphenol is obtained in high yield.

If the reaction between phenol and cyclopentadiene is conducted at a low temperature, for example, as defined above, and in the presence of only a small amount of catalyst, as also defined hereinabove, the formation of di and tricyclopentenylphenols is favored.

If the reaction between phenol and cyclopentadiene is conducted at high temperatures and in the presence of at least ½ percent of catalyst, a hard, dark, resinous polymer which is extremely acid and alkali-resistant is obtained. The exact structure of the polymer is not kown although it is quite likely that it contains recurring phenol and cyclopentane units in the chain.

The several reactions and the nature of the products formed will be apparent from the following reaction equations:

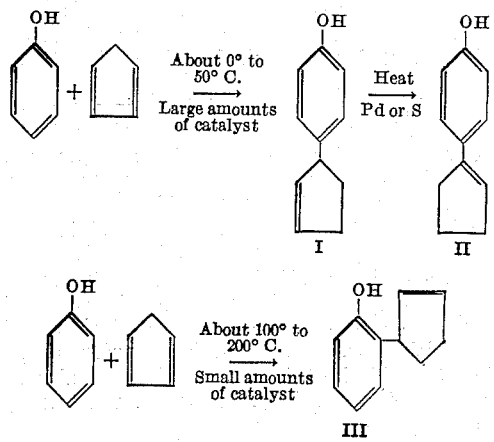

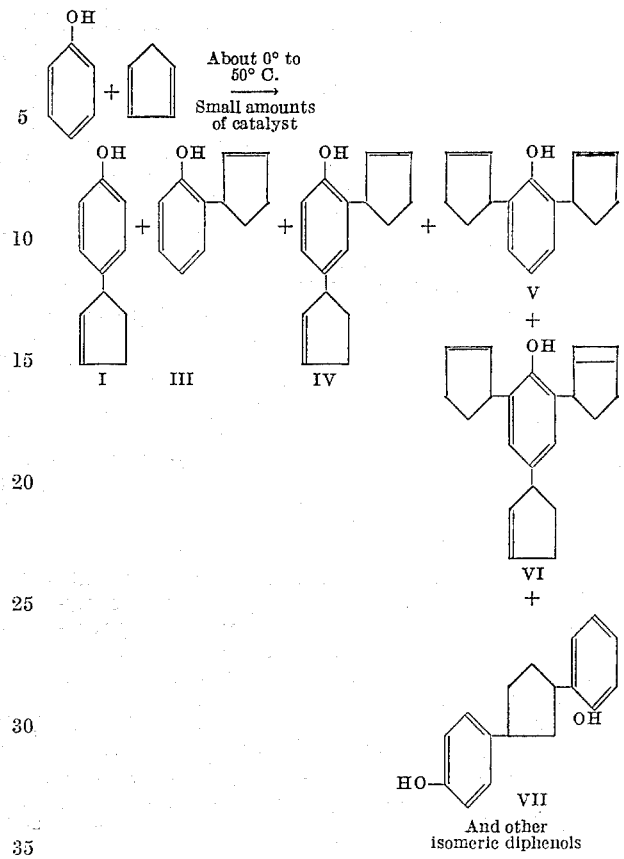

And other isomeric diphenols

While the above discussion and reaction equations are directed to methods of carrying out the reaction whereby predominant amounts of one particular product are obtained, it is to be understood that a mixture of the various products, including some polyphenol and polymer are obtained regardless of the manner in which the reaction is carried out. It is also to be understood that the reaction of phenol and cyclopentadiene is used for illustrative purposes only and that the reaction proceeds satisfactorily when any of the phenols of the type described hereinabove are brought into contact with substituted cyclopentadienes in the presence of a Friedel-Crafts type catalyst.

It is apparent from the foregoing reaction equations that paracyclopentenylphenol (compound I) undergoes isomerization in the presence of palladium or sulfur or other isomerization catalyst to give paracyclopentenylphenol in which the double bond is in conjugate relation with respect to a double bond in the phenolic ring. Other cycloalkenylphenols prepared according to the method of the present invention also undergo isomerization in a similar manner. Moreover, the cycloalkenylphenols may also be hydrogenated in the presence of a catalyst such as nickel, platinum or the like to give cycloalkylphenols which are also very useful compounds.

If cyclopentadiene is replaced by dicyclopentadiene or other homopolymer of cyclopentadiene and the resultant mixture of homopolymer and phenol is refluxed in the presence of a Friedel-Crafts catalyst at a temperature of about 150° C. to 180° C. or higher, decomposition of the homopolymer occurs to form cyclopentadiene which reacts with the phenol to give a cyclopentenylphenol; at temperatures below 100° C. the homopolymer does not decompose and the quantity of cycloalkenylphenol formed, if any, is for all practical purposes negligible.

It will be seen from the following examples, which are intended to illustrate more fully the process of the invention, that the reaction of a phenol with a cyclopentadiene proceeds readily whenever the reactants are brought into effective contact with one another in the presence of a Friedel-Crafts type catalyst. The examples are not intended to limit the scope of the invention, for there are, of course, numerous possible variations and modifications.

*Example I*

In this example phenol and cyclopentadiene are reacted at low temperatures and in the presence of large amounts of catalysts to form a mixture of cyclopentenylphenols consisting largely of I, with small quantities of III, IV, V and VI. In the reaction, 940 grams of phenol are mixed with 1000 cc. of toluene and 297 grams of 85 percent phosphoric acid. To this mixture at a temperature maintained initially at 25° C. is added 340 grams of cyclopentadiene dissolved in 500 cc. of toluene, the addition being effected with continuous stirring of the mixture over a period of two hours. Under these conditions, the reaction temperature rises to 40° C. and the reaction mixture is cooled and stirred for an additional 18 hours. At the end of that time, 180 grams of anhydrous sodium carbonate is added to neutralize the phosphoric acid. The salt is then filtered off and washed with toluene and the resultant filtrate containing the desired product is stripped under a subatmospheric pressure of 10 millimeters (absolute) in order to remove unreacted material such as cyclopentadiene, dicyclopentadiene, solvent and unreacted phenol.

When the reaction is carried out on a small scale it is convenient to neutralize the catalyst with some mild base such as sodium carbonate. However in large scale operations, it may be more economical to remove the acid catalyst by a water-washing process.

After removal of all of the unreacted phenol, there remains 691 grams of a product which is fractionated under a sub-atmospheric pressure of 1.2 millimeters (absolute) to yield 470 grams of paracyclopentenylphenol, and 110 grams of a mixture of dicyclopentenylphenol, and tricyclopentenylphenols. The paracyclopentenylphenol, when redistilled, constitutes a crystalline white solid melting within a range of 62° to 63° C. and boiling at 114° to 117° C. under a pressure of 1.5 millimeters of mercury. Its absorption spectrum in the ultra-violet range shows two maxima, one at 225 mu of log $\epsilon$ 3.9 and the other at 279 mu of log $\epsilon$ 3.30. The maxima at these wave lengths show that the double bond in the cyclopentene ring is not conjugated with respect to the benzene ring. The product is characterized by forming a crystalline para nitrophenylurethan derivative melting at 173° C. and which depresses the melting point of the para nitrophenylurethan of orthocyclopentenylphenol.

*Example II*

In this example, low temperatures of reaction and small amounts of catalyst are employed. In carrying out the reaction, a mixture of 940 grams of phenol, 250 milliliters of toluene and 6 grams of 85% phosphoric acid is formed and while the mixture is under agitation at a temperature of 30° C., 165 grams of cold (liquid) cyclopentadiene are added over a period of three hours. The reaction mixture is stirred at room temperature for 18 hours, and at the end of that time the catalyst is neutralized with 8 grams of anhydrous sodium carbonate. Any unreacted starting materials are eliminated by vacuum distillation in the same manner as in Example I. The product (230) grams is then split into three fractions by vacuum distillation. The first fraction is taken within the boiling range of 100° to 135° C. under a pressure of 1.3 millimeters of mercury (absolute). This fraction constitutes 75 grams and is a mixture of ortho and paracyclopentenylphenol. The second fraction is taken within a boiling range of 135 to 200° C. under a pressure of 1.3 millimeters of mercury (absolute). This fraction constitutes a yield of 80 grams. Redistillation of this fraction yields dicyclopentenylphenol, B. P. 140°–145° C./0.5 mm. $n_d^{25}$ 1.579. There remains in the distillation flask a residue (67 grams) consisting largely of tricyclopentenylphenol and other high molecular weight phenols.

*Example III*

This example illustrates the use of relatively high temperatures of reaction and small amounts of catalyst in the formation of a reaction product by the interaction of phenol and dicyclopentadiene. In the reaction, a mixture of 2243 grams of phenol, 660 grams of dicyclopentadiene, and 5 grams of syrupy phosphoric acid, are admixed in a flask provided with a reflux condenser, a thermometer and a source of inert gas (carbon dioxide or nitrogen or the like). The mixture is refluxed for 22 hours during which time the temperature varies between 150° and 170° C. These temperatures are at or near the cracking point of dicyclopentadiene.

At the conclusion of the reflux period, the unreacted phenol and dicyclopentadiene are removed by vacuum distillation. There remains 1,132 grams of a reaction product which is washed with water and distilled at a pressure of 0.5 millimeter of mercury (absolute) to yield 895 grams of a light yellow oil. This oil is then agitated with a 10 percent (by weight) solution of aqueous potassium hydroxide in water.

The alkali soluble fraction constituting 330 grams consists of a mixture of phenols, which mixture is largely orthocyclopentenylphenol, and also contains some di and tricyclopentenylphenols, cyclopentanediphenols and polyphenols. The orthocyclopentenylphenol can be purified in any convenient manner, for example, by vacuum distillation, to provide a water white oil. This oil boils at 81° C. under a pressure of 0.4 millimeter of mercury (absolute); $n_d^{25}$ 1.565;

$$d_{25}^{25}\ 1.0755$$

Two maxima are indicated in the ultra-violet spectrum, one being of log $\epsilon$3.8 at 220 mu and the other being of log $\epsilon$3.4 at 275 mu. These maxima show that the double bond in the cyclopentene ring is not conjugated with respect to a double bond in the benzene ring. The product forms a crystalline para nitrophenylurethan derivative melting at 165° C. The urethan derivative is of the formula $C_{18}H_{16}O_4N_2$ and it depresses the melting point of the corresponding derivative of the para isomer by 30° C. The diphenols formed are substantially colorless materials which boil in the range of 160° to 220° C./0.5 mm., the elementary analyses and molecular weight of which is in accord with the formula $C_{17}H_{18}O_2$.

*Example IV*

In this example, 46 grams of orthocyclopentenylphenol are dissolved in 200 milliliters of methanol in an autoclave and are hydrogenated at 100° C. over a period of 4 hours, 3 grams of Raney nickel being employed as a catalyst. A yield of 46 grams of orthocyclopentylphenol melting at 26° to 30° C. is obtained. This product can be crystallized from aqueous methanol to form fine white needles with a melting point of 40° C. The reaction is represented by the equation:

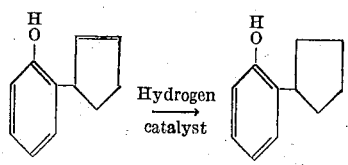

*Example V*

100 grams of paracyclopentenylphenol melting at 62° C. are hydrogenated in methanol solution with an Adams platinum oxide catalyst to yield 100 grams of paracyclopentylphenol

melting at 69° C. This phenol forms a crystalline para nitrophenylurethan melting at 198–199° C.

*Example VI*

This example illustrates the isomerization, or rearrangement of the double bond in the cyclopentenyl radical of paracyclopentenylphenol (compound I, M. P. 62° C.) to effect conjugation between the double bond of the cyclopentenyl radical and one of the double bonds of the benzene ring. The reaction proceeds in accordance with the following equation:

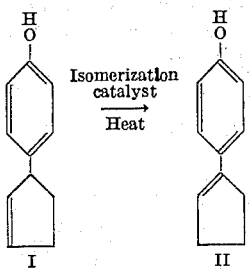

50 grams of compound (I) are admixed with 1 gram of 5 percent palladium on charcoal in a flask equipped with a condenser, and the mixture is heated until compound (II) distills off and is collected by condensation. The conjugated isomer can be crystallized from solution in ethanol in the form of shiny platelets melting at 149° C. The product forms a monoacetate melting at 73° C.

By application of the principles as illustrated in the preceding examples, numerous cycloalkenyl derivatives of phenol or phenols can readily be prepared. Some of the compounds so prepared include the following:

2-($\Delta 2$ cyclopentenyl) phenol
2-($\Delta 1$ cyclopentenyl) phenol
4-($\Delta 2$ cyclopentenyl) phenol
4-($\Delta 1$ cyclopentenyl) phenol
2,4-di($\Delta 2$ cyclopentenyl) phenol
2,4-di($\Delta 1$ cyclopentenyl) phenol
2,6-di($\Delta 2$ cyclopentenyl) phenol
2,6-di($\Delta 1$ cyclopentenyl) phenol
2,6-di($\Delta 1$ cyclopentenyl) phenol
2,4,6,-tri($\Delta 2$ cyclopentenyl) phenol
2,4,6-tri($\Delta 1$ cyclopentenyl) phenol Generally, the double bond of the cyclopentenyl group can be selectively hydrogenated in the manner illustrated in Example IV for the hydrogenation of orthocyclopentenylphenol to form orthocyclopentylphenol. They can also be subjected to rearrangement of the double bond of the cyclopentenyl group in the manner illustrated in Example VI.

The foregoing examples have been more particularly directed to the preparation of cyclopentenyl substituted monohydric phenols. It will be obvious from the preceding discussions however that phenol may be replaced in the reaction by various polyhydroxy phenols as well as alkyl or alkoxy derivatives of phenol or of alkyl or alkoxy derivatives of polyhydroxy phenols.

*Example VII*

Example I is repeated except that para cresol is substituted for the phenol. 2-cyclopentenyl-p-cresol, an oil with a pleasant, earthy odor, B. P. 105°–108° C. 1.3 mm., $n_D^{25}$ 1.5595;

$$d_{25}^{25}\ 1.0570$$

is obtained.

*Example VIII*

Example I is repeated substituting 350 grams of guaiacol for the phenol. Cyclopentenyl substituted guaiacol is obtained.

It is also within the scope of the invention to bubble vaporous cyclopentadiene into liquid phenol containing the Friedel-Crafts catalyst until a substantial amount of the phenol has reacted. The cyclopentadiene vapors may be above 140° C. in order to reduce homopolymerization. The phenol may be at any desired temperature, for example, in the range of −20° C. to 200° C.

*Example IX*

A mixture of 188 grams of phenol, 264 grams of dicyclopentadiene and 50 grams of phosphoric acid is refluxed for 4 hours. The resulting product is a hard, dark, acid and alkali-resistant polymeric material useful as a coating and molding resin.

When the above examples are repeated substituting cyclopentadienes possessing hydrocarbon, halogen or other groups attached to the ring structure, good results are obtained. For example, when methyl cyclopentadiene is substituted for cyclopentadiene in Example I, a good yield of methylcyclopentenylphenol is obtained. Similarly when chlorocyclopentadiene is reacted with phenol in accordance with the method of Example I, chlorocyclopentenylphenol is obtained.

The compounds prepared according to the method of the invention, many of which are believed never to have been known heretofore, are very useful materials. For example, the cyclopentenylphenols and the polyphenols are useful as intermediates in the preparation of organic chemicals and in addition many of them possess fungicidal, insecticidal and herbicidal properties as well as being useful for many other purposes.

Although specific examples of the invention have been herein disclosed it is not intended to limit the invention solely thereto, but to include all the variations and modifications falling within the scope of the appended claims.

I claim:

1. A method of preparing cyclopentenyl derivatives of a phenolic compound selected from the class consisting of phenol, p-cresol and guaiacol, which comprises reacting cyclopentadiene with said phenolic compound at a temperature of about 0° C. to 150° C., and in the presence of a catalyst selected from the class consisting of aluminum chloride, ferric chloride, antimony pentachloride, boron trifluoride, zinc chloride, titanium chloride, hydrofluoric acid, sulfuric acid, phosphoric acid, phosphorus pentoxide, stannic chloride, bismuth chloride, tellurium dichloride, and tellurium tetrachloride, and recovering said cyclopentenyl derivatives from the reaction mixture.

2. The method of claim 1 wherein the phenolic compound is phenol.

3. The method which comprises bringing together a phenolic compound selected from the class consisting of phenol, p-cresol, and guaiacol, with cyclopentadiene, in the presence of about 5 percent to 100 percent by weight, based on the weight of the phenol, of phosphoric acid, and at a temperature of about 0° C. to 50° C., whereupon chemical reaction occurs to form as the predominant product a paracyclopentenyl derivative of said phenolic compound.

4. The method of claim 3 wherein the phenolic compound is phenol.

5. The method which comprises bringing together a phenolic compound selected from the class consisting of phenol, p-cresol, and guaiacol, with a member of the class consisting of cyclopentadiene and lower homopolymers thereof, in the presence of less than about 5 percent by weight, based on the weight of the phenol, of phosphoric acid, and at a temperature of about 100° C. to 200° C., whereupon chemical reaction occurs to form as the predominant product an orthocyclopentenyl derivative of said phenolic compound.

6. The method of claim 5 wherein the phenolic compound is phenol.

7. The method of claim 6 wherein the member of the class consisting of cyclopentadiene and lower homopolymers thereof is cyclopentadiene.

8. The method which comprises bringing together a phenolic compound selected from the class consisting of phenol, p-cresol, and guaiacol, with cyclopentadiene, in the presence of less than about 5 percent by weight, based on the weight of the phenol, of phosphoric acid, and at a temperature of about 0° C. to 50° C., whereupon chemical reaction occurs to form as the predominant product said phenolic compound having a plurality of hydrogens in the phenolic ring each replaced by a cyclopentenyl group.

9. The method of claim 8 wherein the phenolic compound is phenol.

References Cited in the file of this patent

UNITED STATES PATENTS

| 2,553,470 | Pines | May 15, 1951 |
| 2,558,812 | Bloch | July 3, 1951 |
| 2,583,638 | Evans | Jan. 29, 1952 |

FOREIGN PATENTS

| 615,448 | Germany | July 4, 1935 |

OTHER REFERENCES

Chemical Abstracts, vol. 22, pp. 1141–1142 (1928).
Chemical Abstracts, vol. 23, pp. 4687–4690 (1929).
Chemical Abstracts, vol. 33, pp. 2130–2131 (1939).
Chemical Abstracts, vol. 35, p. 4367 (1941).
Mueller et al.: Jour. Amer. Chem. Soc., vol. 74 (July 5, 1952), pp. 3426–7.